Aug. 18, 1953     R. E. SMITH     2,649,073
TEAT PROTECTOR FOR DAIRY CATTLE
Filed July 13, 1950
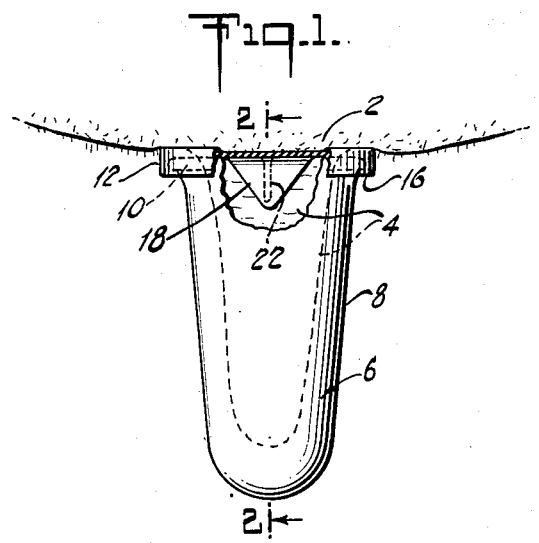
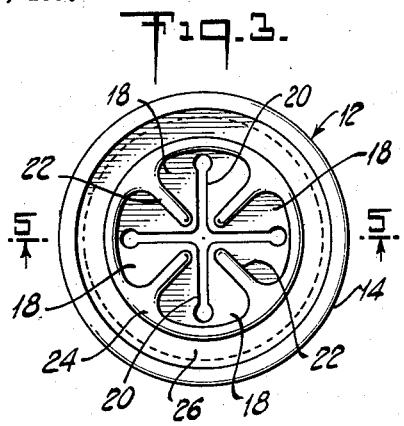
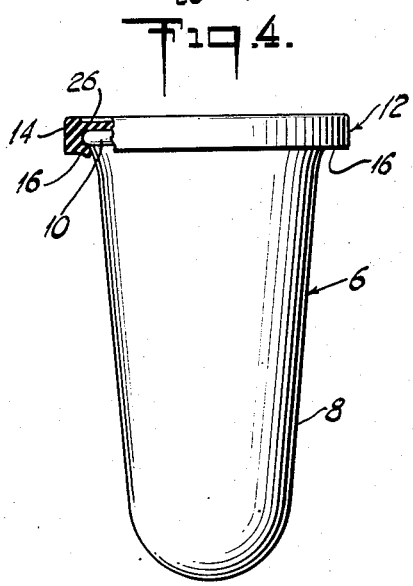
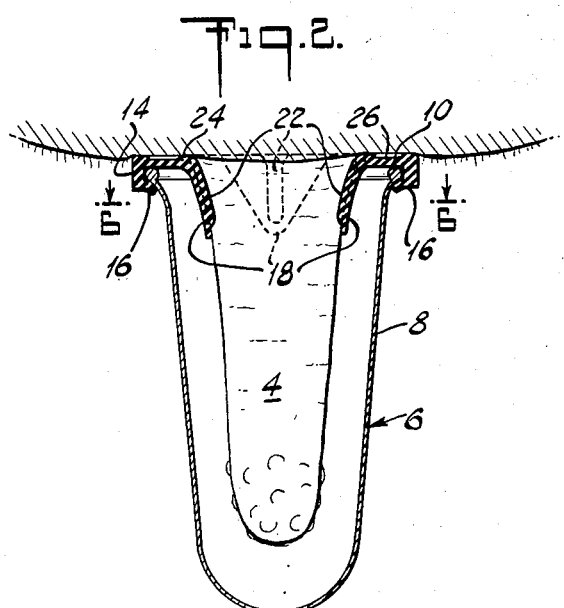
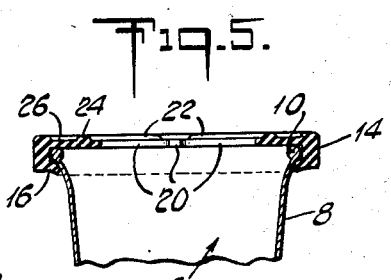
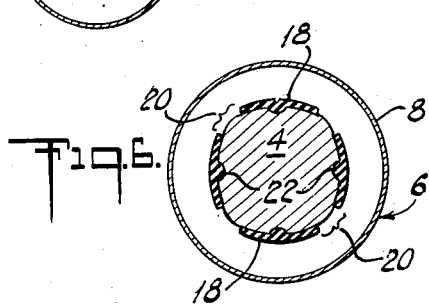
INVENTOR
*Reuben E. Smith.*
BY
*Curtis, Morris & Safford.*
ATTORNEYS.

Patented Aug. 18, 1953

2,649,073

UNITED STATES PATENT OFFICE 2,649,073

TEAT PROTECTOR FOR DAIRY CATTLE

Reuben E. Smith, Margaretsville, N. Y.

Application July 13, 1950, Serial No. 173,560

5 Claims. (Cl. 119—146)

This invention relates to dairy herd equipment, and more in particular to devices for protecting the teat of a cow; for example, to prevent injury or infection.

An object of this invention is to provide for the protection of the teats of dairy cattle in a simple and thoroughly practical manner. A further object is to provide a protective device which may be readily positioned and removed and which will retain itself in place without inflicting injury or undue restrictions. A further object is to provide devices of the above character which are inexpensive and simple in construction, which are sturdy and light-weight and which are adaptable to varying conditions of use and to meet many problems which arise. These and other objects will be in part obvious and in part pointed out below.

The invention accordingly consists in the features of construction, combinations of elements, and arrangements of parts as will be exemplified in the structure to be hereinafter described and the scope of the application of which will be indicated in the following claims.

In the drawing:

Figure 1 is an elevational view of the device attached to an animal. Parts have been broken away to show deformed attaching means.

Figure 2 is an enlarged vertical section view taken on a median plane, of the device attached to an animal.

Figure 3 is a top plan view of the device before attachment.

Figure 4 is a side view of the device, with parts broken away.

Figure 5 is a partial sectional view taken on line 5—5 of Figure 3.

Figure 6 is a sectional view of Figure 2 taken on lines 6—6.

Veterinarians and herdsmen have long been bothered with the problem of protecting the teats of cows against infection. This is a particularly serious problem after a teat has been injured and the cow is permitted to move about; for example, when grazing in rough country. A cow may injure a teat in anyone of a great many ways; for example, on barbed wire or briars, or other sharp objects or even by kicking or stepping upon the teat herself. The veterinary will treat and bandage such injured teats but when the cow is released she may pass through brush or the like and pull the bandage off, or she may lie down or pass down in or pass through stagnant water so that the injury becomes reinfected or opened up again. If bandaging or restricting rubber devices are used which squeeze tightly upon the teat, the circulation of blood through the teat is restricted. Particular difficulty is encountered with high-producing cows where the udder is large and the udder and teats become distended.

In accordance with the present invention, protective devices are provided for the teats of cows whereby the objections and dangers referred to above are avoided. A teat is protected without danger of interfering with circulation and, at the same time, the device will stay in place even during extreme conditions of use. The invention contemplates the provision of protective devices even where the teats are not injured. That is, for the purpose of protection when there is danger of injury or infection. Thus, for example, with high-producing cows, particularly when production tests are being run, the cows may be equipped with protective devices at all times other than during the milking operation. These devices are easily installed and while a variety of sizes may be provided, a single size may be used on teats of a wide range in size and shape.

Referring particularly to Figure 1 of the drawing, the portion of a cow's udder is indicated at 2 having a teat 4 extending therefrom. Enclosing the teat is an imperforate cup 6 which is of plastic, illustratively, vinyl chloride, the structure of which is best shown in Figure 4. Cup 6 has a relatively rigid thin wall 8 with an enlarged rim or bead 10 at its upper edge, illustratively, two inches in diameter, and slightly tapered side walls terminating in a hemispherical bottom portion, illustratively, one and one-quarter inches in diameter, and here the total heighth of the cup shown is three and one-half inches. Cup 6 is retained in place by a flexible rubber anchor or retaining ring 12 which has a relatively heavy outer rim portion 14 with an inwardly directed bottom flange or rim 16 which forms a groove snugly receiving rim 10 of cup 6. Ring 12 thus holds the cup securely in place but the cup may be removed and positioned in place by turning the rim 16 downwardly.

Ring 12 is in turn resiliently secured to the teat by four somewhat triangular tabs or segments 18 which (see Figure 2) are integral with the rim portion 14. These tabs 18 normally tend to project in a single plane as shown in the upper portion of Figure 3 and they are separated by four equally spaced radial slots 20. Each of the tabs has a radial rib or raised portion 22 which connects to an annular rib or raised portion 24 which extends throughout the zone where the tabs are attached to the main rim portion 14. The main rim portion 14 has an annular web 26 of reduced thickness which connects rim 24 and therefore the tabs to the thicker main body of the rim portion 14. Referring now again to Figure 1, the retaining ring 12 is pushed upwardly onto the teat to the position shown with the tabs 18 displaced from their position as shown in Figures 2 and 3 and extending downwardly along the adjacent surface of the teat. These tabs press resiliently against the teat but the force is not sufficient to inflict injury or to restrict circulation. This carefully controlled resilient effect is obtained with the structure shown wherein the raised ribs 22 and annular rib 24 tend to return to the original single plane condition while they cooperate with the web 26 and the thinner sections of the tabs. When the tabs 18 are deflected to the position of Figure 1, the raised portions or ribs are thus urged into contact with the teat and the periphery of the retaining ring 12 is thus urged upwardly with some resiliency against the adjacent area of the udder. In installing the device the retaining ring is separated from cup 6 and is moved upwardly onto the teat and during this procedure the tabs 18 may be held out away from the teat so that they pass any injured portion thereof. With the retaining ring then properly positioned as shown in Figure 1, the tabs are permitted to move against the sides of the teat; they then hold the retaining ring in place and will resist considerable force. The cup is then attached to the retaining ring by turning the rim 16 downwardly while the rim portion 10 moves into the annular groove. Cup 6 is light in weight and has a somewhat ideal exterior surface so that it does not tend to become engaged with any wire, briars, or other objects. Furthermore, the retaining ring 12 is positioned at the udder where it does not present a problem of becoming engaged by such objects. Thus, while the retaining ring will resist a substantial force tending to pull it downwardly, there is no real possibility for a substantial force to be exerted in this manner. With this device there is a tendency for the retaining ring to somewhat seal the top of cup 6 and so that while it permits air and vapor to pass to and from the cup, there is a tendency for water to be trapped out of the cup. Thus, with the device installed, the teat is protected from contamination as referred to above. The cup has sufficient rigidity to resist the pressures involved due to kicking or when, for example, the cow lies down, and therefore an injured teat is not apt to become reinjured when the device is in place, and a bandage thereon is protected.

The device is normally cleaned and sterilized prior to installation and may be readily put in place by a veterinary or herdsman. When the devices are used upon uninjured teats for protecting against possible contamination, infection or injury, they are regularly removed and sterilized at the time that the cows are milked. In any event, they may be installed immediately after milking and they adjust themselves automatically to a distended condition of the udder and teats after installation.

As many possible embodiments may be made of the above invention and as many changes might be made in the embodiment above set forth, it is to be understood that matter hereinbefore set forth, or shown in the accompanying drawing, is to be interpreted as illustrative and not in a limiting sense.

I claim:

1. In a device of the character described for protecting the teat of a cow, the combination of, a retaining ring of rubber or the like and having an outer rim portion with radial portions which project toward each other and are adapted to be flexed and to exert resilient pressure and an imperforate cup of substantially rigid material removably held at its upper edge by said retaining ring.

2. In a protector device of the character described for protecting the teat of a cow, the combination of, a retaining ring which is adapted to surround the upper end of a teat and to present a resilient surface engaging the udder surface adjacent the teat, resilient fingers fixed to said ring and projecting radially inwardly and adapted to be deflected downwardly when the retaining ring is positioned on a teat and to exert resilient pressure against the sides of the teat, and a protecting structure adapted to be carried by said retaining ring and to project downwardly therefrom in spaced relationship with respect to the teat.

3. A device as described in claim 2 wherein said retaining ring and said resilient fingers are formed of a single piece of resilient rubber and wherein there are four of said fingers which tend to return to a common plane condition, each of said fingers being connected to the rim portion of the retaining ring by a web of rubber of reduced cross-section.

4. A device as described in claim 3 wherein each of said fingers has a radial rib on its upper surface, and an annular rib connected to said radial ribs.

5. Apparatus as described in claim 4 wherein said protecting structure is a relatively rigid cup having a smooth outer surface and an enlarged top rim, and wherein said retaining ring includes a downwardly and inwardly projecting flange which is adapted to grip said rim and thereby hold the cup in place.

REUBEN E. SMITH.

References Cited in the file of this patent

UNITED STATES PATENTS

| Number | Name | Date |
|---|---|---|
| 65,978 | Wilder et al. | June 18, 1867 |
| 473,770 | Murchland | Apr. 26, 1892 |
| 827,160 | Lane | July 31, 1906 |
| 849,521 | Worcester | Apr. 9, 1907 |
| 1,260,466 | Sharples | Mar. 26, 1918 |
| 2,442,176 | Orr et al. | May 25, 1948 |

FOREIGN PATENTS

| Number | Country | Date |
|---|---|---|
| 245,269 | Italy | Feb. 20, 1926 |